United States Patent
Tonini et al.

(10) Patent No.: US 11,897,306 B2
(45) Date of Patent: Feb. 13, 2024

(54) VEHICLE SUSPENSION SYSTEM WITH A SENSOR

(71) Applicant: DANA ITALIA S.R.L., Trento (IT)

(72) Inventors: Daniele Tonini, Arco (IT); Federico Bavaresco, Arco (IT)

(73) Assignee: DANA ITALIA S.R.L., Trento (IT)

( * ) Notice: Subject to any disclaimer, the term of this patent is extended or adjusted under 35 U.S.C. 154(b) by 0 days.

(21) Appl. No.: 17/453,161

(22) Filed: Nov. 1, 2021

(65) Prior Publication Data
US 2022/0134823 A1    May 5, 2022

(30) Foreign Application Priority Data

Nov. 2, 2020 (DE) ............... 20 2020 106 260.3

(51) Int. Cl.
  *B60G 3/20* (2006.01)
  *B60G 17/016* (2006.01)
  *B60G 17/019* (2006.01)

(52) U.S. Cl.
  CPC ........... *B60G 3/20* (2013.01); *B60G 17/0162* (2013.01); *B60G 17/01941* (2013.01)

(58) Field of Classification Search
  CPC .................... B60G 3/20; B60G 17/01941; B60G 2204/11; B60G 17/019; B60G 2204/116
  See application file for complete search history.

(56) References Cited

U.S. PATENT DOCUMENTS

| | | | |
|---|---|---|---|
| 4,864,295 A * | 9/1989 | Rohr | G01D 5/2403 340/870.37 |
| 5,242,190 A | 9/1993 | Morris | |
| 5,396,973 A | 3/1995 | Schwemmer et al. | |
| 6,126,177 A * | 10/2000 | Steinert | B60G 17/01933 280/DIG. 1 |
| 6,445,178 B1 * | 9/2002 | Hoekstra | G01D 18/001 324/202 |
| 6,937,928 B2 | 8/2005 | Capito | |
| 7,370,853 B2 * | 5/2008 | Urquidi | B60G 17/019 267/276 |
| 7,389,998 B2 | 6/2008 | Kondo et al. | |

(Continued)

FOREIGN PATENT DOCUMENTS

| | | |
|---|---|---|
| CN | 108638782 A | 10/2018 |
| EP | 1623856 A2 | 2/2006 |
| EP | 1939073 A2 | 7/2008 |

*Primary Examiner* — Paul N Dickson
*Assistant Examiner* — Tiffany L Webb
(74) *Attorney, Agent, or Firm* — McCoy Russell LLP

(57) ABSTRACT

A vehicle suspension system including a vehicle body portion is provided herein. The vehicle suspension system further includes a first suspension lever which is pivotally mounted with respect to a first pivot axis on a first region of the vehicle body portion and pivotally connects a wheel hub or a steering knuckle to the vehicle body portion. The vehicle suspension system further includes a rotation sensor with a first sensor portion of the sensor is fixedly connected to the vehicle body portion and a second sensor portion is fixedly connected to the first suspension lever, where the first and second sensor portions are rotatable with respect to each other about a sensor rotation axis, and the rotation angle between the first and second sensor portions with respect to each other indicates a pivot angle of the first suspension lever.

13 Claims, 3 Drawing Sheets

(56) References Cited

U.S. PATENT DOCUMENTS

| | | | | |
|---|---|---|---|---|
| 8,179,128 B2* | 5/2012 | Klank | ............... | B60G 17/019 |
| | | | | 324/179 |
| 9,452,657 B1 | 9/2016 | Giaier et al. | | |
| 9,643,527 B2* | 5/2017 | Uranaka | ............... | B60K 17/30 |
| 10,279,644 B2* | 5/2019 | Kerner | ............... | B60G 17/019 |
| 10,532,621 B2* | 1/2020 | Sasaki | ............... | B60G 7/02 |
| 2006/0220638 A1* | 10/2006 | Urquidi | ............... | G01D 5/145 |
| | | | | 324/207.2 |

* cited by examiner

VEHICLE SUSPENSION SYSTEM WITH A SENSOR

CROSS-REFERENCE TO RELATED APPLICATION

The present application claims priority to German Utility Model Application No. 20 2020 106 260.3, entitled "VEHICLE SUSPENSION SYSTEM WITH A SENSOR", and filed on Nov. 2, 2020. The entire contents of the above-listed application is hereby incorporated by reference for all purposes.

TECHNICAL FIELD

The present disclosure relates to a suspension system for a vehicle with a sensor and may be applicable in the field of automotive technology, such as in off-highway vehicles, not excluding applicability in other fields like railway mobility or the like.

BACKGROUND AND SUMMARY

Suspension of wheels of a vehicle has a long history, developing from the application of springs of different types to the modern kind of suspensions with various constructions comprising one or more suspension levers. In order to further increase the comfort and reliability of suspensions, more and more sensors are integrated into suspension systems that allow for monitoring and in some cases control of the suspension. Such sensors and their integration into suspension systems according to the prior art are mostly complex, expensive and do not always have the desired accuracy and reliability.

In the prior art, U.S. Pat. No. 5,242,190 relates to a unitary Sensor assembly for automotive vehicles and shows a rotary position sensor as a suspension sensor for measuring the relative vertical position of a wheel relative to the chassis of a vehicle.

U.S. Pat. No. 5,396,973 relates to a variable shock absorber with integrated controller, actuator and magnetic sensor means that allow for measuring a linear relative movement.

U.S. Pat. No. 6,937,928 relates to a stability control system for a car providing loading Information. A suspension sensor is mentioned without specification of its type or construction.

U.S. Pat. No. 9,452,657 relates to height determination for two independently suspended wheels of a car using a height sensor for only one wheel, working together with a strain sensor and realizing an anti-roll mechanism.

CN 108638782 generally relates to a suspension control system with suspension levers.

EP 1 623 856 relates to a leveling device for a harvesting vehicle. Acceleration sensors are used to differentiate measured values and calculate tilting risks as well as an electric target current that is used for controlling a damping force of a damper. This way, tilting of the vehicle is avoided.

With reference to the prior art, the subject matter of the present disclosure aims at realizing a suspension system for a vehicle with a more reliable and less complex suspension sensor.

This object is solved by a vehicle suspension system, comprising:
a vehicle body portion,
a first suspension lever which is pivotably mounted with respect to a first pivot axis on a first region of the vehicle body portion and pivotably connects a wheel hub or a steering knuckle to said vehicle body portion, and
a sensor,
wherein the sensor is a rotation sensor and wherein a first sensor portion of the sensor is fixedly connected to the vehicle body portion and a second sensor portion is fixedly connected to the first suspension lever,
wherein the first and second sensor portions are rotatable with respect to each other about a sensor rotation axis, and
wherein the rotation angle between the first and second sensor portions with respect to each other indicates a pivot angle of the first suspension lever.

One advantage of the presently proposed suspension system includes use of a rotation sensor with first and second sensor portions that are rotatable with respect to each other about a sensor rotation axis. This rotation sensor may be encapsulated or at least protected and shielded in order to avoid contamination and potentially destruction or disturbance of measurements by environmental influences like typically dirt or dust as well as fluids like rainwater. The sensor may be built in as a whole and coupled to the vehicle body portion and to the suspension lever, respectively. Calibration can be avoided or reduced to a minimum.

A potential implementation of the presently proposed suspension system may provide that one of the first sensor portion and the second sensor portion is a pin and the other sensor portion is a body with a hole through which the pin penetrates. In this way, both sensor portions may easily be protected against environmental influences like dust and water and may work together well without disturbance. The pin may fit well into the hole with very small gaps.

Further, an embodiment of the presently proposed suspension system may be realized by aligning the pin and the hole of the sensor to the sensor rotation axis, wherein they may be formed and positioned cylindrically symmetrical with regard to the sensor rotation axis. This construction allows for an optimized function with minimized gaps between the pin and the wall of the hole.

A further implementation may provide that the first pivot axis is aligned in parallel to the sensor rotation axis. Specifically, the first pivot axis can be identical with the sensor rotation axis. These features allow for an optimized coupling of the first suspension lever with the sensor.

It may further be provided that one of the first and second sensor portions, for instance a pin, is fixed to a bracket which is fixedly connected to the first suspension lever.

It is advantageous to fix one portion of the sensor on the first suspension lever in a place that is as close as possible to the pivot axis. With respect to this requirement, it is a problem that the first suspension lever is pivotable about an axle which penetrates the first suspension lever exactly along the pivot axis. Therefore, the portion of the sensor may be fixedly connected to a separate part which is fixedly connected to the suspension lever and protrudes towards the pivot axis or is intersected by the pivot axis. A part like a bent metal sheet, for example in U-form, such as a U-form bracket, or a rod may be fixed at one or, for instance, two of its ends to the suspension lever and extend in a way that it is intersected by the pivot axis and/or by the sensor rotation axis.

The sensor may be realized as a capacitive, inductive or resistive rotation sensor.

The optimized realization depends on the application environment and the requirements of an application. The different measurement principles are different with regard to achievable accuracy, reliability, reproducibility of measurement results and price.

It may further be provided that the suspension comprises a second suspension lever which is pivotably mounted with respect to a second pivot axis on a second region of the vehicle body portion and pivotably connects the wheel hub or steering knuckle to said vehicle body portion, wherein a distance is provided between the first and second region of the vehicle body portion. This construction allows for a stable, robust construction of a suspension system with the desired or required motion flexibility of the wheel hub or a steering knuckle and with the possibility to effectively and efficiently integrate a damper into the suspension system.

An embodiment of the presently proposed suspension system may provide that the wheel hub or steering knuckle is connected pivotably about a third pivot axis relative to the first and second suspension lever. Therein, the wheel hub or steering knuckle may be pivotable with regard to the first and/or second suspension lever about a third pivot axis which is perpendicular to the first pivot axis.

The movability of the wheel hub or steering knuckle provides for the possibility to shift the wheel relative to the vehicle body in vertical direction and to rotate the wheels about a vertical axis in case the vehicle moves through a curve.

BRIEF DESCRIPTION OF THE FIGURES

An embodiment of the presently proposed suspension system is described in the following detailed description and is depicted in the figures.

DETAILED DESCRIPTION

Figure 1:
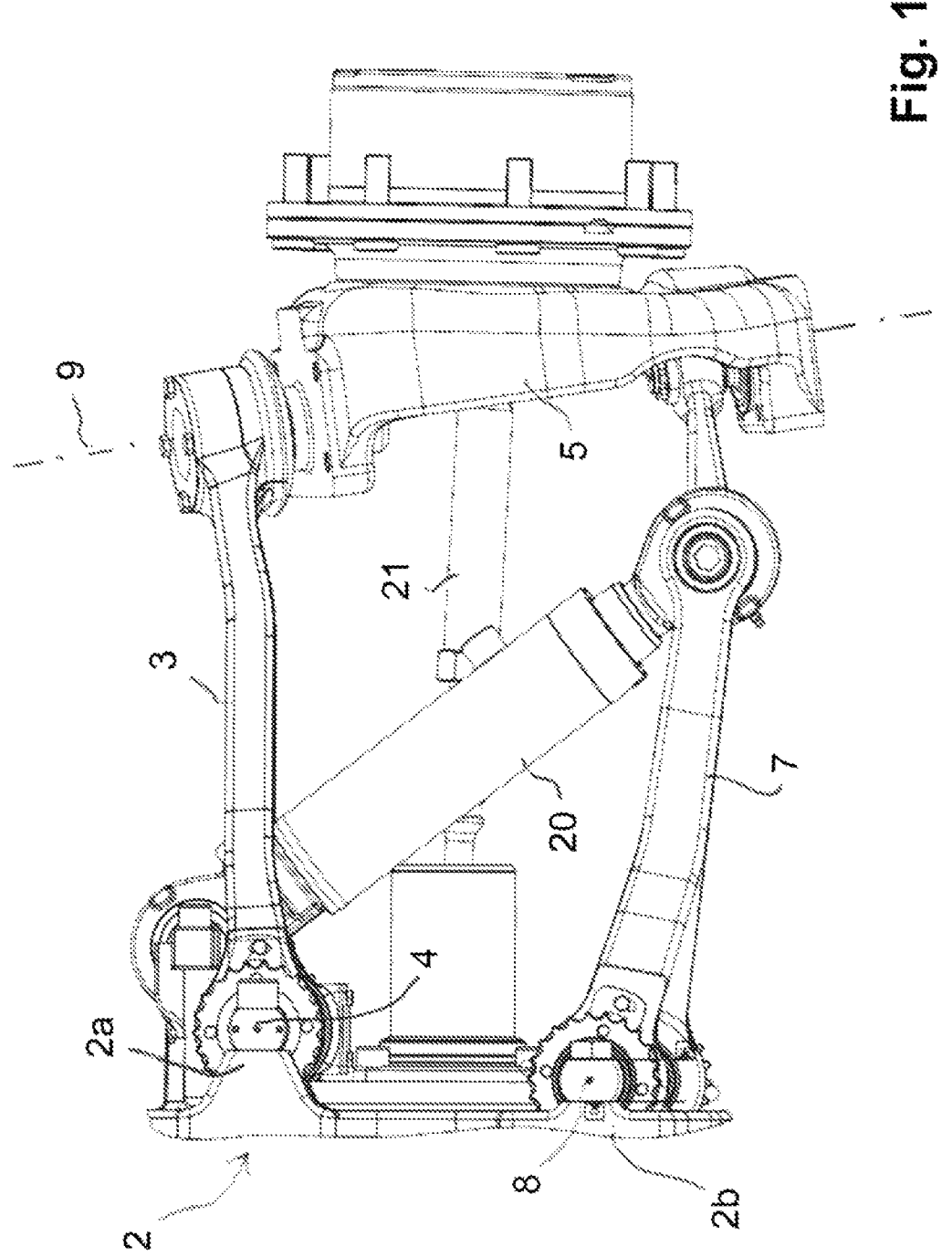
FIG. 1 shows a general view on the suspension of a wheel of a vehicle.

FIG. 1 shows, in an overview, the construction of a suspension system of a vehicle. The vehicle may be an off-highway vehicle such as a wheel loader, a dumper, a material handling vehicle, a dumper, a tractor, a harvester, or the like. However, the suspension system depicted in FIG. 1 could also be used in a passenger car or in a railway vehicle. On the left side, reference sign 2 represents a vehicle body portion or a part of a car chassis. The part 2 could also be a housing. A first suspension lever 3 is pivotably connected with the vehicle body portion 2 in region 2a. The suspension lever 3 is pivotable about an axis 4, which is perpendicular to the drawing plane. A second suspension lever 7 is pivotably connected to the vehicle body portion 2 in region 2b. The second suspension lever 7 is pivotable about an axis 8 that is parallel to the axis 4.

A wheel hub or steering knuckle 5 is connected with the second and/or the first lever 3 and the second and/or the second suspension lever 7. The wheel hub or steering knuckle supports a wheel of a vehicle (not represented in FIG. 1). The steering knuckle is pivotable about the axis 9.

In FIG. 1 a damper 20 is shown, which may be a hydraulic or a pneumatic damper. A drive axle for the wheel is designated by reference sign 21. When the load or any dynamic force acting on the wheel, and indirectly on the wheel hub or steering knuckle, is changing, the inclination of both the first and the second suspension lever 3, 7 changes, and the relative angle between the suspension levers 3, 7 and the vehicle body portion 2 changes with it.

In order to monitor the load and/or forces acting on the wheel and/or on the suspension, the angle between the suspension levers 3, 7 and the vehicle body portion 2 is measured and monitored. This angle is measured by a sensor 1 that is positioned in a region of the pivot axis 4 of the first suspension lever 3.

Figure 2:
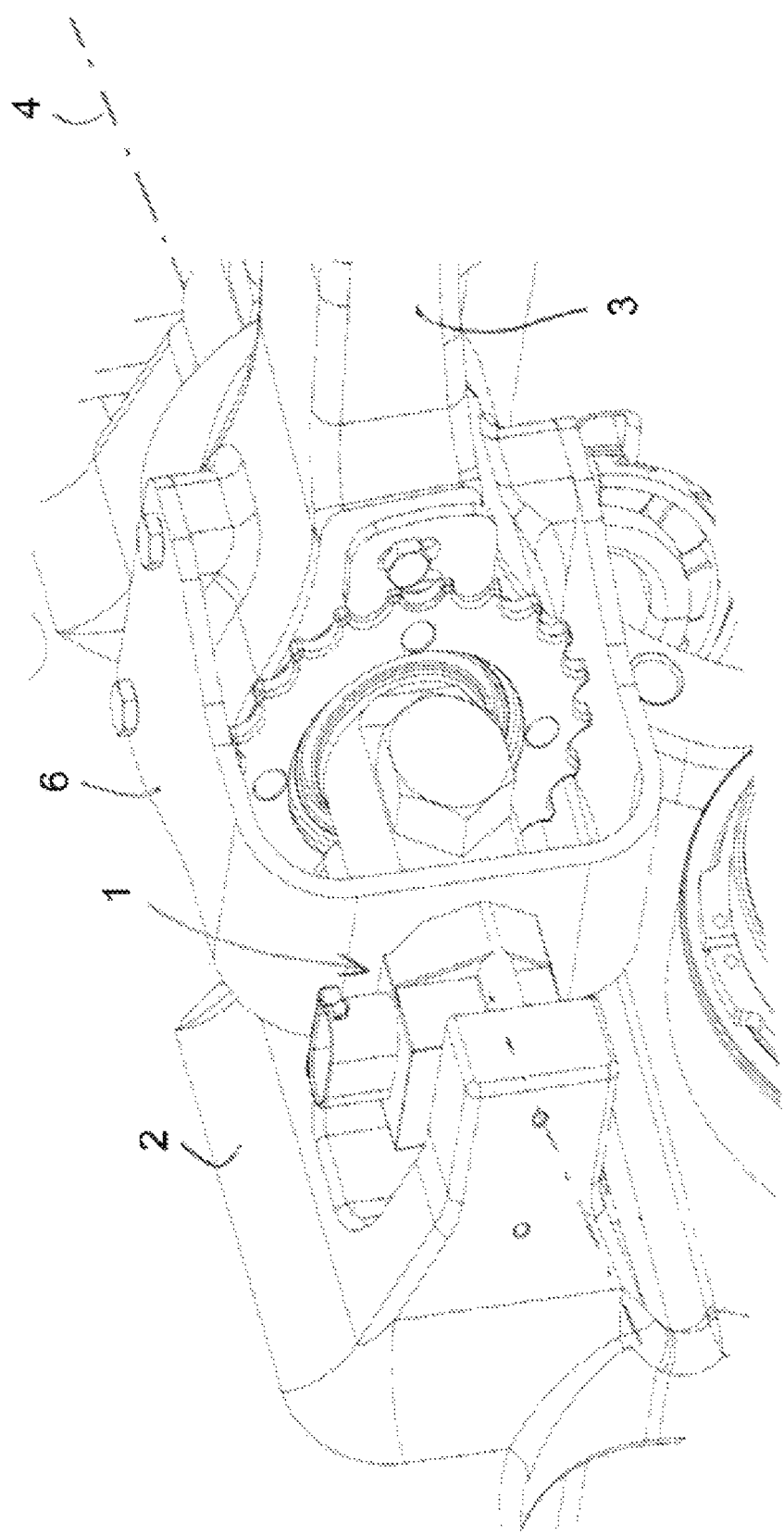
FIG. 2 shows a 3D view on a rotation sensor mounted between a suspension lever and a body portion of the vehicle.
Figure 3:
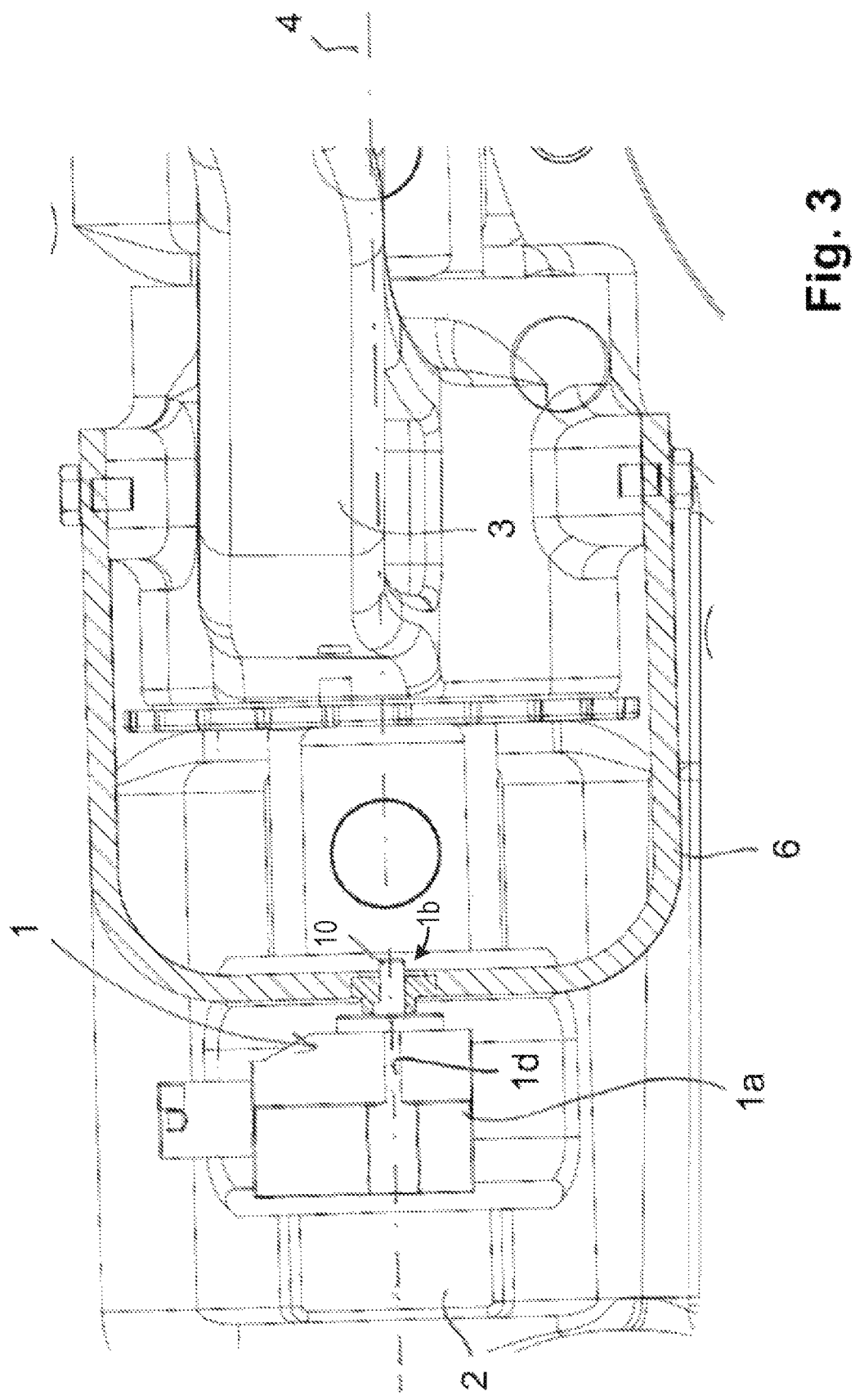
FIG. 3 shows a view on the sensor in a direction parallel to the longitudinal axis of the first suspension lever.

FIG. 2 shows an enlarged and more detailed section of the suspension system shown in FIG. 1, wherein the pivot axis 4 of the first suspension lever 3 as well as one end of the suspension lever 3 are shown. Reference sign 2 indicates a vehicle body portion or housing that is fixedly connected to the vehicle body portion 2. Reference sign 1 indicates the sensor, and in more detail a housing of the sensor in which a first sensor portion is located. The first sensor portion is fixedly connected to the vehicle body portion 2 via the housing of the sensor 1. A second sensor portion 1b, shown in more detail in FIG. 3, is fixedly connected to a bracket 6, which is fixedly connected to the suspension lever 3. This second sensor portion 1b has the form of a pin that protrudes into a hole of the housing of the sensor 1.

FIG. 3 shows a view along the longitudinal axis of suspension lever 3. The suspension lever 3 is coupled at its end to the vehicle body portion 2, and this portion is shown in FIG. 3. FIG. 3 also shows the pivot axis 4, the first suspension lever 3 being pivotable about said axis 4. Together with suspension lever 3, the bracket 6, which is fixedly connected to the suspension lever, pivots about the axis 4. The U-shaped metal sheet bracket 6 is fixed to the suspension lever 3 by screws at both of its ends. Instead of a bracket a bent metal sheet could be used as well as long as it is fixedly connected to the lever 3.

In a hole of the bracket 6, a pin 10 is fixed as second sensor portion so that the pin pivots about the axis 4 when the lever 3 is pivoting. Pin 10 protrudes through opening 1d in the first sensor portion 1a and rotates about the first sensor portion 1a. Thereby a sensor signal is produced that is indicative of the inclination angle of the lever 3 about the vehicle portion 2.

As the sensor 1 is completely sealed to the outside, it is very robust and not susceptible to environmental influences, or at least is well protected against such influences. Mechanical and electrical tolerances may be very small, so that the accuracy and reproducibility of measured angle values is high. In order to increase the reproducibility and reliability of measurements, the cross-section of pin 1b may be asymmetrical, and it may fit into the opening in bracket 6 in a form-fit manner. In that case, a calibration of the sensor is not necessary when mounting the sensor 1 and the bracket 6.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle suspension system, comprising:
a vehicle body portion;
a first suspension lever which is pivotally mounted, with respect to a first pivot axis, to a first region of the vehicle body portion and pivotally mounted to a steering knuckle; and
a rotation sensor;
wherein a first sensor portion of the sensor is fixedly connected to the vehicle body portion and a second sensor portion of the sensor is fixedly connected to a U-shaped bracket that is fixedly connected to the first suspension lever;
wherein the first and second sensor portions are rotatable with respect to each other;
wherein a rotation angle between the first sensor portion and the second sensor portion with respect to each other indicates a pivot angle of the first suspension lever;
wherein the U-shaped bracket is fixedly connected to the first suspension lever at opposing ends of the U-shaped bracket; and
wherein the second sensor portion extends through the U-shaped bracket and pivots about an axis of rotation of the first suspension lever.

2. The vehicle suspension system according to claim 1, wherein the second sensor portion includes a pin and the first sensor portion is a body with a hole through which the pin penetrates.

3. The vehicle suspension system according to claim 2, wherein the pin and the hole of the sensor are aligned with the first pivot axis.

4. The vehicle suspension system according to claim 3, wherein the pin and the hole of the sensor are formed and positioned coaxial to each other.

5. The vehicle suspension system according to claim 2, wherein the first pivot axis is aligned in parallel to the pin.

6. The vehicle suspension system according to claim 2, wherein the first pivot axis extends through the pin.

7. The vehicle suspension system according to claim 1, wherein the U-shaped bracket is fixedly connected to the first suspension lever via screws.

8. The vehicle suspension system according to claim 7, wherein the second sensor portion includes a pin.

9. The vehicle suspension system according to claim 1, wherein the sensor is a capacitive, inductive, or resistive rotation sensor.

10. The vehicle suspension system according to claim 1, further comprising a second suspension lever which is pivotally mounted with respect to a third pivot axis on a second region of the vehicle body portion and pivotally connects the steering knuckle to said vehicle body portion.

11. The vehicle suspension system according to claim 10, wherein the wheel hub or steering knuckle is connected pivotally about a third pivot axis relative to the first suspension lever and the second suspension lever.

12. The vehicle suspension system according to claim 11, wherein the wheel hub or steering knuckle is pivotable with regard to the first suspension lever and/or the second suspension lever about the third pivot axis which is perpendicular to the first pivot axis.

13. The vehicle suspension system according to claim 10, wherein a distance is provided between the first region and the second region of the vehicle body portion.

* * * * *